United States Patent
Niimi et al.

(10) Patent No.: US 10,132,268 B2
(45) Date of Patent: Nov. 20, 2018

(54) PISTON AND METHOD FOR MANUFACTURING PISTON

(71) Applicants: Aisin Seiki Kabushiki Kaisha, Kariya-shi, Aichi-ken (JP); Advanced Laser Technology Research Center Co. Ltd., Anjo-shi, Aichi-ken (JP)

(72) Inventors: Takuya Niimi, Handa (JP); Akihiro Okamoto, Nishio (JP); Keiki Sugano, Aichi-ken (JP); Ryo Okazaki, Kariya (JP); Muneharu Kutsuna, Anjo (JP); Kiyotaka Saito, Aichi-ken (JP)

(73) Assignees: AISIN SEIKI KABUSHIKI KAISHA, Kariya-Shi, Aichi-Ken (JP); ADVANCED LASER TECHNOLOGY RESEARCH CENTER CO., LTD., Anjo-Shi, Aichi-Ken (JP)

( * ) Notice: Subject to any disclaimer, the term of this patent is extended or adjusted under 35 U.S.C. 154(b) by 78 days.

(21) Appl. No.: 15/032,584

(22) PCT Filed: Oct. 22, 2014

(86) PCT No.: PCT/JP2014/078040
§ 371 (c)(1),
(2) Date: Apr. 27, 2016

(87) PCT Pub. No.: WO2015/064434
PCT Pub. Date: May 7, 2015

(65) Prior Publication Data
US 2016/0265474 A1  Sep. 15, 2016

(30) Foreign Application Priority Data

Oct. 30, 2013 (JP) ................................ 2013-225086
Nov. 29, 2013 (JP) ................................ 2013-247538

(51) Int. Cl.
| F02F 3/00 | (2006.01) |
| F02F 3/10 | (2006.01) |
| B23P 15/10 | (2006.01) |

(52) U.S. Cl.
CPC .............. *F02F 3/0084* (2013.01); *F02F 3/10* (2013.01); *B23P 15/10* (2013.01); *F02F 2200/00* (2013.01); *F05C 2251/10* (2013.01)

(58) Field of Classification Search
CPC ........ F02F 3/0084; F02F 3/10; F02F 2200/00; F05C 2251/10; B23P 15/10
See application file for complete search history.

(56) References Cited

U.S. PATENT DOCUMENTS

| 4,997,024 A | * | 3/1991 | Cole ................... B22D 19/0027 164/103 |
| 2006/0016690 A1 | * | 1/2006 | Ostrovsky .............. C25D 11/36 205/104 |

(Continued)

FOREIGN PATENT DOCUMENTS

| JP | 05-086443 A | 4/1993 |
| JP | 2006-083757 A | 3/2006 |

(Continued)

OTHER PUBLICATIONS

International Search Report (PCT/ISA/210) dated Jan. 20, 2015, by the Japanese Patent Office as the International Searching Authority for International Application No. PCT/JP2014/078040.

(Continued)

*Primary Examiner* — Joseph Dallo
*Assistant Examiner* — Kurt Liethen
(74) *Attorney, Agent, or Firm* — Buchanan Ingersoll & Rooney PC

(57) ABSTRACT

This piston includes a piston main body made of aluminum or an aluminum alloy, used in an internal combustion and a (Continued)

modified layer formed on a surface of a strength reinforced portion of the piston main body, having a surface made of aluminum oxide by plasma oxidation, to which compressive residual stress is applied.

7 Claims, 5 Drawing Sheets

(56) References Cited

U.S. PATENT DOCUMENTS

| | | | | |
|---|---|---|---|---|
| 2007/0099015 A1* | 5/2007 | Kamo | ................... | C23C 18/02 |
| | | | | 428/469 |
| 2010/0062179 A1 | 3/2010 | Adachi et al. | | |
| 2010/0275874 A1 | 11/2010 | Fujiwara et al. | | |
| 2014/0295670 A1* | 10/2014 | Shih | ................... | H01L 21/3065 |
| | | | | 438/710 |
| 2015/0107448 A1* | 4/2015 | Palazzolo | ............... | B23P 13/00 |
| | | | | 92/169.1 |

FOREIGN PATENT DOCUMENTS

| | | |
|---|---|---|
| JP | 2006-320907 A | 11/2006 |
| JP | 2007-169753 A | 7/2007 |
| JP | 2007-216241 A | 8/2007 |
| JP | 2008-051091 A | 3/2008 |
| JP | 2010-065253 A | 3/2010 |

OTHER PUBLICATIONS

Written Opinion (PCT/ISA/237) dated Jan. 20, 2015, by the Japanese Patent Office as the International Searching Authority for International Application No. PCT/JP2014/078040.

* cited by examiner

STRUCTURE OF MODIFIED LAYER OF STRENGTH
REINFORCED PORTION (TOP PORTION 10, SKIRT PORTION 11)

LASER PEENING TREATMENT

PISTON AND METHOD FOR MANUFACTURING PISTON

TECHNICAL FIELD

The present invention relates to a piston and a method for manufacturing a piston.

BACKGROUND ART

In general, a piston including a piston main body made of aluminum or an aluminum alloy and a method for manufacturing the same are known. Such a piston and a method for manufacturing the same are disclosed in Japanese Patent Laying-Open No. 2008-51091, for example.

In Japanese Patent Laying-Open No. 2008-51091, there is disclosed an internal combustion piston on which shot peening treatment is performed by injecting injection powders of strengthening elements and/or photocatalytic elements onto a surface of a piston main body made of an aluminum-silicon alloy. On this internal combustion piston, the shot peening treatment is performed, whereby the aluminum-silicon alloy in the vicinity of the surface of the piston main body is modified, and the strength is improved to some extent.

In recent years, a reduction in the weight of the piston is significantly required, and hence an additional reduction in the thickness of the piston is required. Even if the thickness of the piston is further reduced, it is necessary to ensure fatigue strength in a high-temperature environment required by the piston.

PRIOR ART

Patent Document

Patent Document 1: Japanese Patent Laying-Open No. 2008-51091

SUMMARY OF THE INVENTION

Problem to be Solved by the Invention

In the shot peening treatment performed on the internal combustion piston described in Japanese Patent Laying-Open No. 2008-51091, however, a modified layer of the aluminum-silicon alloy in the vicinity of the surface of the piston main body is shallow due to weak pressure applied to the surface of the piston main body, and hence there is such a problem that it is difficult to ensure the fatigue strength in a high-temperature environment required by the piston when the thickness of the piston is further reduced in order to further reduce the weight of the piston.

The present invention has been proposed in order to solve the aforementioned problem, and an object of the present invention is to provide a piston and a method for manufacturing a piston each capable of sufficiently ensuring fatigue strength in a high-temperature environment required by the piston even when the thickness of the piston is further reduced in order to further reduce the weight of the piston.

Means for Solving the Problem

The inventors have made deep studies for attaining the aforementioned object, to find the following structure in order to solve the aforementioned problem. More specifically, a piston according to a first aspect of the present invention includes a piston main body made of aluminum or an aluminum alloy, used in an internal combustion and a modified layer formed on a surface of a strength reinforced portion of the piston main body, having a surface made of aluminum oxide by plasma oxidation, to which compressive residual stress is applied.

In the piston according to the first aspect of the present invention, as hereinabove described, the modified layer having the surface made of aluminum oxide by plasma oxidation, to which compressive residual stress is applied, is formed on the surface of the strength reinforced portion of the piston main body. Thus, the surface of the modified layer is made of aluminum oxide having high hardness by plasma oxidation, and hence the hardness of the surface of the modified layer can be improved. Furthermore, stress required to generate plastic deformation can be increased due to the modified layer to which compressive residual stress is applied, and hence the mechanical strength of the piston can be sufficiently improved not only at normal temperature but also in a high-temperature environment of at least about 250° C. Thus, even when the thickness of the piston is further reduced, fatigue strength in the high-temperature environment required by the piston can be sufficiently ensured. This has already been confirmed by experiments conducted in order to confirm the effect of the present invention, described later. The thickness and weight of the piston can be further reduced, and hence the weights of other members (a con rod, a flywheel, etc.) of an engine adjusted according to the weight of the piston can also be reduced. Consequently, the weight of the entire engine can be reduced, and hence the fuel efficiency of the engine can be improved.

In the aforementioned piston according to the first aspect, the modified layer preferably has hardness larger than the hardness of a base material of the piston main body. According to this structure, not only the hardness of the vicinity of the surface of the modified layer made of aluminum oxide having high hardness by plasma oxidation but also the hardness of the modified layer other than the surface can be made larger than the hardness of the base material, and hence the hardness of the modified layer can be further improved. Consequently, the fatigue strength in the high-temperature environment required by the piston can be easily improved even when the thickness of the piston is further reduced.

In the aforementioned piston according to the first aspect, the piston main body is preferably made of cast metal of aluminum or an aluminum alloy, and the modified layer is preferably formed by melting and resolidifying a casting surface of the strength reinforced portion of the piston main body made of cast metal. According to this structure, the casting surface is melted and resolidified, whereby minute defects such as cold shuts, blowholes, or the like formed in the casting surface can be removed, and hence the fatigue strength of the modified layer in the high-temperature environment can be further improved.

In the aforementioned piston according to the first aspect, the modified layer is preferably formed by laser peening treatment. According to this structure, the modified layer having the surface made of aluminum oxide by plasma oxidation, to which compressive residual stress is applied can be easily formed on the surface of the strength reinforced portion of the piston main body. Furthermore, the laser peening treatment is used to emit laser light while controlling emission conditions such as an emission position, and hence the modified layer can be more evenly formed on the surface of the strength reinforced portion of the piston main body, as compared with shot peening treatment in which powders are randomly injected onto a surface.

In the aforementioned piston according to the first aspect, the surface of the strength reinforced portion of the piston main body preferably includes at least the inner surface of a top portion of the piston main body. According to this structure, the hardness of the inner surface of the top portion of the piston main body to which a large load is applied can be sufficiently improved, and hence the fatigue strength in the high-temperature environment required by the piston can be ensured while the thickness (weight) of the top portion of the piston main body is reduced.

In the aforementioned piston according to the first aspect, the modified layer is preferably formed by melting and resolidifying a cutting surface of the strength reinforced portion of the piston main body. According to this structure, the cutting surface is melted and resolidified, whereby the surface roughness of the cutting surface is changed such that minute concavities and convexities can be formed. Thus, the fatigue strength of the modified layer in the high-temperature environment can be further improved.

In the aforementioned piston according to the first aspect, the modified layer is preferably modified to have hardness larger than the hardness of a base material of the piston main body by strain age hardening caused by a fine precipitate induced by peening treatment and work-hardening caused by an increase in dislocation density. According to this structure, stress required to generate plastic deformation can be increased due to the modified layer having the improved hardness, and hence the mechanical strength of the piston in the high-temperature environment can be sufficiently improved. Thus, the fatigue strength in the high-temperature environment can be sufficiently ensured even when the thickness of the piston used in the high-temperature environment is further reduced. Furthermore, the piston can be reduced in thickness and weight, and hence the weight of a mechanical product using the piston can be reduced.

A method for manufacturing a piston according to a second aspect of the present invention includes preparing a piston main body made of aluminum or an aluminum alloy, used in an internal combustion, and forming a modified layer having a surface made of aluminum oxide by plasma oxidation, to which compressive residual stress is applied, on a surface of a strength reinforced portion of the piston main body by generating plasma by emission of laser light of ultrashort pulse high peak output density, having a pulse width of not more than 100 nanoseconds, to the surface of the strength reinforced portion of the piston main body under a prescribed emission condition and performing laser peening treatment on the strength reinforced portion of the piston main body with pressure of the plasma that is generated.

In the method for manufacturing the piston according to the second aspect of the present invention, as hereinabove described, the modified layer having the surface made of aluminum oxide by plasma oxidation, to which compressive residual stress is applied, is formed on the surface of the strength reinforced portion of the piston main body. Thus, the surface of the modified layer is made of aluminum oxide having high hardness by plasma oxidation, and hence the hardness of the surface of the modified layer can be improved. Furthermore, stress required to generate plastic deformation can be increased due to the modified layer to which compressive residual stress is applied, and hence the mechanical strength of the piston can be sufficiently improved not only at normal temperature but also in a high-temperature environment of at least about 250° C. Thus, even when the thickness of the piston is further reduced, fatigue strength in the high-temperature environment required by the piston can be sufficiently ensured. Therefore, the thickness and weight of the piston can be reduced, and hence the weights of other members (a con rod, a flywheel, etc.) of an engine adjusted according to the weight of the piston can also be reduced. Consequently, the weight of the entire engine can be reduced, and hence the fuel efficiency of the engine can be improved. Moreover, the laser peening treatment is used to emit the laser light while controlling the emission condition such as an emission position, and hence the modified layer can be more evenly formed on the surface of the strength reinforced portion of the piston main body, as compared with shot peening treatment in which powders are randomly injected onto a surface.

In the aforementioned method for manufacturing a piston according to the second aspect, forming the modified layer preferably includes forming the modified layer having the surface made of aluminum oxide by the plasma oxidation, to which compressive residual stress is applied, on the surface of the strength reinforced portion of the piston main body by performing the laser peening treatment on the strength reinforced portion of the piston main body in a state where a liquid film is arranged on the surface of the strength reinforced portion of the piston main body. According to this structure, diffusion of a shock wave resulting from the generated plasma can be suppressed by the liquid film arranged on the surface of the strength reinforced portion of the piston main body, and hence the shock wave can be concentrated and transmitted from the surface of the strength reinforced portion of the piston main body toward an internal portion of the piston main body. Thus, the modified layer can be formed to a deep region of the strength reinforced portion of the piston main body, and hence the fatigue strength in the high-temperature environment required by the piston can be easily ensured even when the thickness (weight) of the piston is reduced.

In the aforementioned method for manufacturing a piston according to the second aspect, the modified layer preferably has hardness larger than the hardness of a base material of the piston main body. According to this structure, not only the hardness of the vicinity of the surface of the modified layer made of aluminum oxide having high hardness by plasma oxidation but also the hardness of the modified layer other than the surface can be made larger than the hardness of the base material, and hence the hardness of the modified layer can be further improved. Consequently, the fatigue strength in the high-temperature environment required by the piston can be easily improved even when the thickness of the piston is further reduced.

In the aforementioned method for manufacturing a piston according to the second aspect, the piston main body is preferably made of cast metal of aluminum or an aluminum alloy, and forming the modified layer preferably includes melting and resolidifying a casting surface of the strength reinforced portion of the piston main body made of cast metal and forming the modified layer having the surface made of aluminum oxide by plasma oxidation, to which compressive residual stress is applied, by performing the laser peening treatment on the strength reinforced portion of the piston main body. According to this structure, the casting surface is melted and resolidified, whereby minute defects such as cold shuts, blowholes, or the like formed in the casting surface can be removed, and hence the fatigue strength of the modified layer in the high-temperature environment can be further improved.

In the aforementioned method for manufacturing a piston according to the second aspect, forming the modified layer preferably includes forming the modified layer on the inner surface of a top portion of the piston main body by performing the laser peening treatment on at least the inner surface of the top portion of the piston main body. According to this structure, the hardness of the inner surface of the top portion of the piston main body to which a large load is applied can be sufficiently improved, and hence the fatigue strength in the high-temperature environment required by the piston can be ensured while the thickness (weight) of the top portion of the piston main body is reduced.

In the aforementioned method for manufacturing a piston according to the second aspect, preparing the piston main body preferably includes forming a cutting surface on the piston main body by cutting, and forming the modified layer preferably includes melting and resolidifying the cutting surface of the strength reinforced portion of the piston main body and forming the modified layer having the surface made of aluminum oxide by plasma oxidation, to which compressive residual stress is applied, by performing the laser peening treatment on the strength reinforced portion of the piston main body. According to this structure, the cutting surface is melted and resolidified, whereby the surface roughness of the cutting surface is changed such that minute concavities and convexities can be formed. Thus, the fatigue strength of the modified layer in the high-temperature environment can be further improved.

In the aforementioned method for manufacturing a piston according to the second aspect, forming the modified layer preferably includes generating a fine precipitate induced by peening treatment on the surface of the strength reinforced portion of the piston main body and forming the modified layer modified to have hardness larger than the hardness of a base material of the piston main body by strain age hardening caused by the fine precipitate and work-hardening caused by an increase in dislocation density. According to this structure, stress required to generate plastic deformation can be increased due to the modified layer having the improved hardness, and hence the mechanical strength of the piston in the high-temperature environment can be sufficiently improved. Thus, the fatigue strength in the high-temperature environment can be sufficiently ensured even when the thickness of the piston used in the high-temperature environment is further reduced. Furthermore, the piston can be reduced in thickness and weight, and hence the weight of a mechanical product using the piston can be reduced.

In the aforementioned method for manufacturing a piston according to the second aspect, forming the modified layer preferably includes forming the modified layer by scanning the surface of the strength reinforced portion of the piston main body a plurality of times with the laser light and performing the laser peening treatment on the strength reinforced portion of the piston main body. According to this structure, the minute concavities and convexities can be reliably formed on the surface 2a of the modified layer 2.

According to the present application, in addition to the piston according to the aforementioned first aspect, the following structure is also conceivable.

More specifically, a piston according to another structure of the present application includes a piston main body including an aluminum portion made of aluminum or an aluminum alloy, used in an internal combustion and a modified layer formed on a surface of a strength reinforced portion of the aluminum portion of the piston main body by laser peening treatment, having a surface made of aluminum oxide by plasma oxidation, to which compressive residual stress is applied. According to this structure, the surface of the modified layer is made of aluminum oxide having high hardness by plasma oxidation, and hence the hardness of the surface of the modified layer can be improved. Furthermore, stress required to generate plastic deformation can be increased due to the modified layer to which compressive residual stress is applied, and hence the mechanical strength of the piston can be sufficiently improved not only at normal temperature but also in a high-temperature environment of at least about 250° C. Thus, fatigue strength in the high-temperature environment required by the piston can be sufficiently ensured even when the thickness of the piston is further reduced. Moreover, the piston can be reduced in thickness and weight, and hence the weights of other members (a con rod, a flywheel, etc.) of an engine adjusted according to the weight of the piston can also be reduced. Thus, the fuel efficiency of the engine can be improved. Consequently, the weight of the entire engine can be reduced. In addition, the laser peening treatment is used to emit laser light while controlling emission conditions such as an emission position, and hence the modified layer can be more evenly formed on the surface of the strength reinforced portion of the aluminum portion of the piston main body, as compared with shot peening treatment in which powders are randomly injected onto a surface.

Effect of the Invention

According to the present invention, as hereinabove described, the piston and the method for manufacturing a piston each capable of sufficiently ensuring the fatigue strength in the high-temperature environment required by the piston even when the thickness of the piston is further reduced in order to further reduce the weight of the piston can be provided.

MODES FOR CARRYING OUT THE INVENTION

An embodiment of the present invention is hereinafter described on the basis of the drawings.

The structure of a piston 100 according to the embodiment of the present invention is described with reference to FIGS. 1 to 5.

Figure 1:
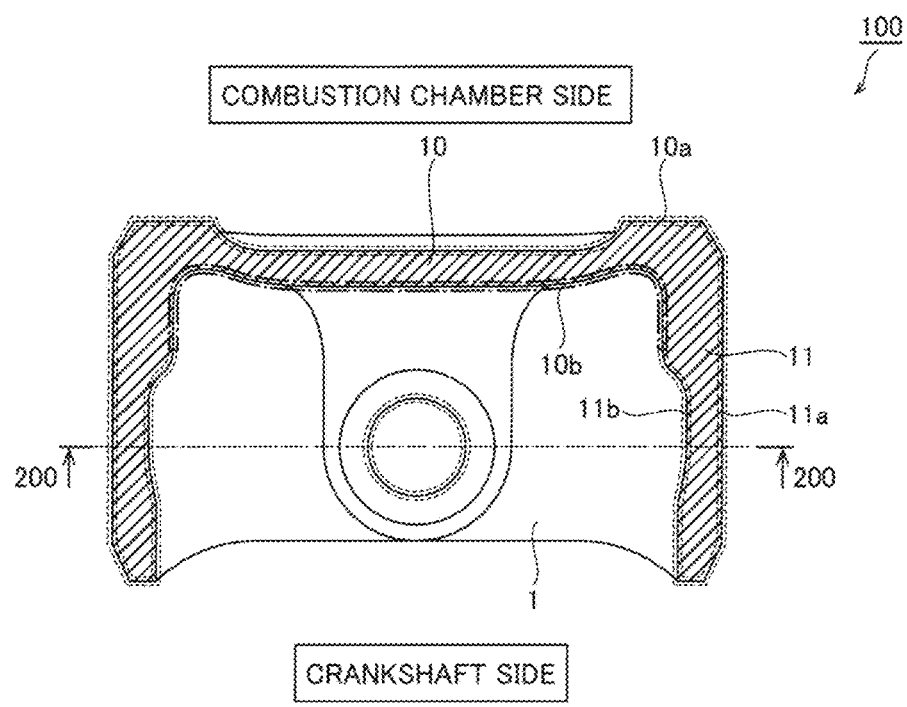
FIG. 1 A sectional view showing a piston according to an embodiment of the present invention.

The piston 100 according to the embodiment of the present invention is a machine component used in an internal combustion (engine) of an unshown vehicle. An air-fuel mixture is combusted in a combustion chamber closer to a top portion 10 (see FIG. 1) in an upper portion of a piston main body 1, whereby this piston 100 is arranged in a high-temperature environment of at least about 250° C. Furthermore, great combustion pressure is applied as stress to the top portion 10 when the air-fuel mixture is combusted in the combustion chamber, as shown in FIG. 1. In addition, a skirt portion 11 in a side portion of the piston main body 1 is slid with respect to the interior surface of an unshown cylinder, whereby stress resulting from frictional force or the like is generated in the skirt portion 11.

Figure 2:
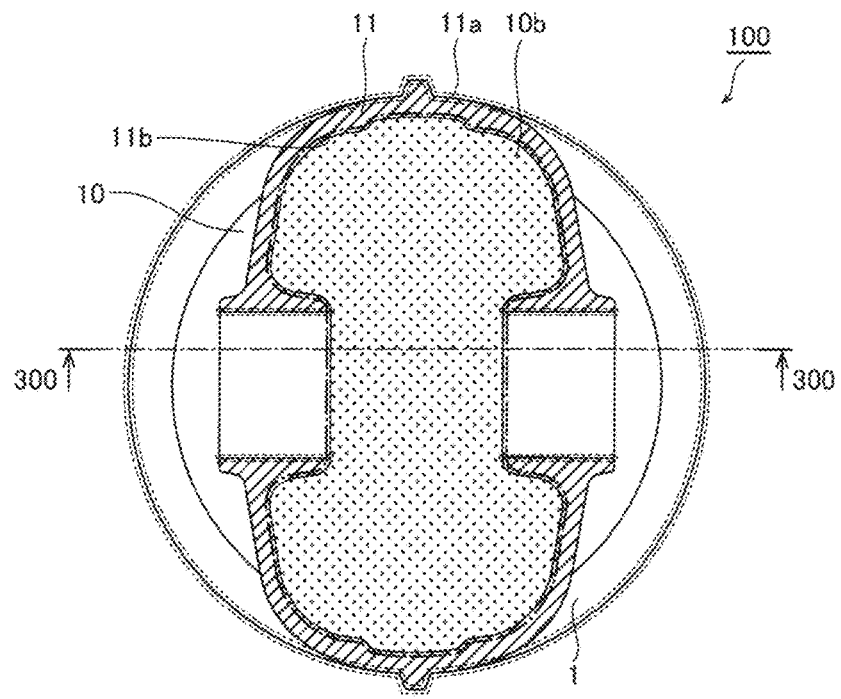
FIG. 2 A sectional view of the piston taken along the line 200-200 in FIG. 1.
Figure 3:
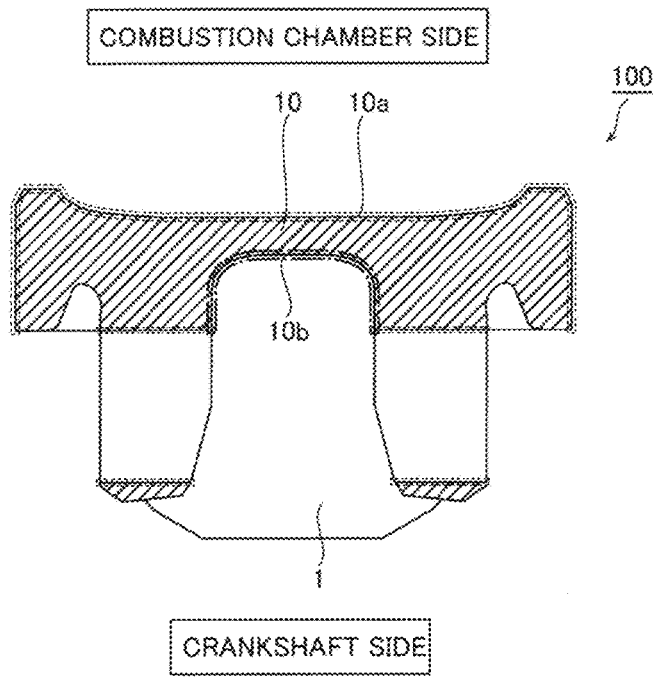
FIG. 3 A sectional view of the piston taken along the line 300-300 in FIG. 2.

Consequently, in the outer surface 10a and the inner surface 10b of the top portion 10 of the piston main body 1 and the outer surface 11a and the inner surface 11b (a surface 1a (see FIG. 4) of a strength reinforced portion) of the skirt portion 11, high hardness (high fatigue strength in the high-temperature environment) is required, as shown in FIGS. 2 and 3. Particularly large stress (load) is applied to upper regions (regions shown by one-dot chain lines in FIGS. 1 to 3) of the inner surface 10b of the top portion 10 and the inner surface 11b of the skirt portion 11, as compared with another surface 1a (a region shown by a broken line in FIGS. 1 to 3) of the strength reinforced portion, and hence particularly high hardness is required in the high-temperature environment.

The piston main body 1 is made of cast metal of an Al-12Si—Cu—Ni alloy (aluminum alloy) containing Mg, Ti, and/or the like as trace elements. After the piston main body 1 is extracted from an unshown casting mold, a prescribed portion such as a central portion of the top portion 10 of the piston main body 1 is cut such that a cutting surface is formed in the prescribed portion of a casting surface.

Figure 4:
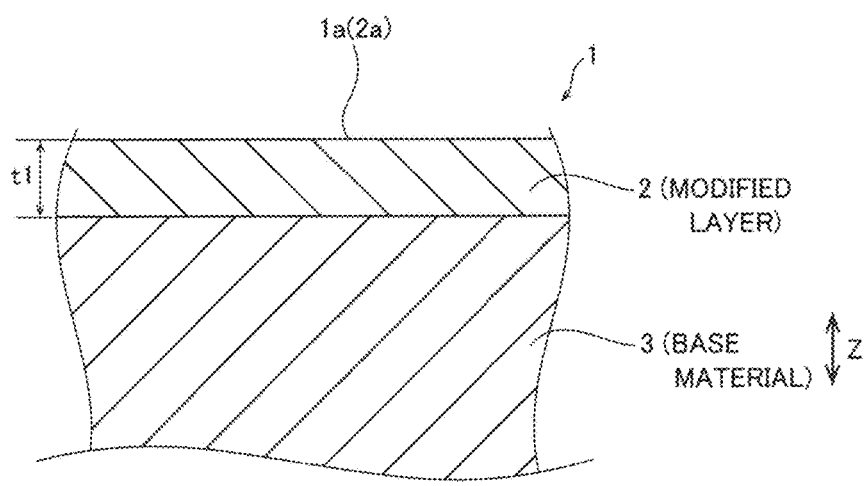
FIG. 4 A sectional view showing a modified layer and a base material of the piston according to the embodiment of the present invention.

In the surface 1a (the outer surface 10a and the inner surface 10b of the top portion 10, the outer surface 11a and the inner surface 11b of the skirt portion 11) of the strength reinforced portion of the piston main body 1, laser peening treatment described later is performed on the casting surface and the cutting surface such that a modified layer 2 is formed, as shown in FIG. 4. This modified layer 2 has a property different from a portion (base material 3) other than the modified layer 2 and a thickness (depth) t1 of at least about 500 μm in a thickness (depth) direction (direction Z) from a surface 2a. In a portion (a portion other than the surface 1a of the strength reinforced portion and a portion of the strength reinforced portion (the top portion 10, the skirt portion 11) inside the modified layer 2) formed with no modified layer 2, the base material 3 is located.

Figure 5:
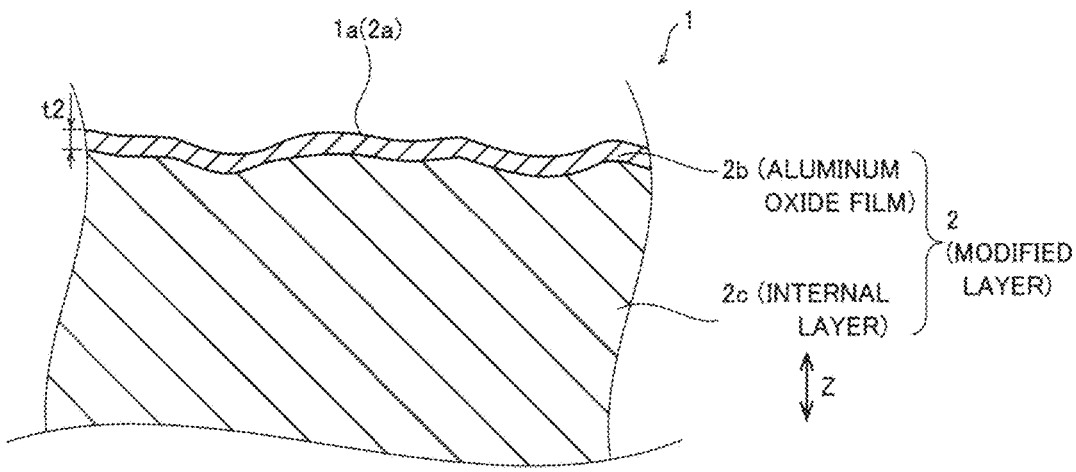
FIG. 5 An enlarged sectional view showing the modified layer of the piston according to the embodiment of the present invention.

According to this embodiment, the modified layer 2 includes an aluminum oxide film 2b formed in the surface 2a and around the surface 2a and an internal layer 2c formed in a portion inside the aluminum oxide film 2b, as shown in FIG. 5. The aluminum oxide film 2b is made of white aluminum oxide having hardness higher than that of the Al-12Si—Cu—Ni alloy (the base material 3 of the piston main body 1) and is formed by plasma oxidation. Specifically, the aluminum oxide film 2b is formed by coupling of cationized Al with oxygen when plasma is generated on the surface 1a of the strength reinforced portion in the laser peening treatment. This aluminum oxide film 2b formed by plasma oxidation is not in the form of a column extending in the thickness (depth) direction, unlike an oxide film in the form of a column extending in the thickness direction, formed by alumite treatment (anodization). The aluminum oxide film 2b has a thickness (depth) t2 of about 1 μm in the thickness direction (direction Z). FIGS. 4 and 5 clearly show a boundary between the modified layer 2 and the base material 3 and a boundary between the aluminum oxide film 2b and the internal layer 2c, respectively, for ease of understanding, but actually, the boundaries are not clear unlike in FIGS. 4 and 5.

The volume expanded by the plasma generated in the laser peening treatment acts as pressure (shock wave), and the surface 1a of the strength reinforced portion of the piston main body 1 and an internal portion (internal layer 2c) of the strength reinforced portion are plastically deformed, whereby the modified layer 2 is formed. Consequently, compressive residual stress resulting from the pressure of the plasma is applied to not only the aluminum oxide film 2b but also the internal layer 2c. Following the plastic deformation resulting from the shock wave, a number of dislocations are conceivably formed in the modified layer 2. Consequently, stress required to generate plastic deformation is increased by work-hardening caused by an increase in dislocation density.

The hardness of the modified layer 2 is larger than the hardness of an Al-12Si—Cu—Ni alloy (the base material 3 of the piston main body 1) on which no laser peening treatment is performed. Specifically, when the piston 100 is arranged for a prescribed time in the high-temperature environment of about 250° C. not more than the recrystallization end temperature (about 400° C.) of the base material 3 constituting the piston main body 1, which is an environment where the piston 100 is actually used, strain age hardening causes a plurality of fine precipitates containing an intermetallic compound and/or an intermediate phase each made of Al and Cu and an intermetallic compound and/or an intermediate phase each made of Al and Ni to congregate in the dislocations in the modified layer 2. These fine precipitates congregating in the dislocations inhibit the movement of the dislocations in the modified layer 2, whereby the hardness of the modified layer 2 is improved, and hence stress required to generate plastic deformation is increased. The size of the fine precipitates is at least about 0.05 μm and not more than about 10 μm.

As specific hardness, the Vickers hardness of the base material 3 of the piston main body 1 is about 70 HV, and the Vickers hardness of the modified layer 2 is at least about 75 HV. Before the piston 100 is arranged in the high-temperature environment of about 250° C. (in a state where no thermal treatment is performed), the Vickers hardness of the base material 3 of the piston main body 1 is about 110 HV, and the Vickers hardness of the modified layer 2 is at least about 120 HV.

The surface 1a (the casting surface and the cutting surface) of the strength reinforced portion of the piston main body 1 made of cast metal is instantaneously taken to an extremely high temperature of at least about 5000° C. by the plasma, whereby in the surface 2a of the modified layer 2, the casting surface and the cutting surface are melted once and are resolidified. Thus, in the surface 2a of the modified layer 2, minute defects existing in cold shuts, blowholes, or the like of the casting surface are repaired, and the surface roughness of the cutting surface is changed.

The surface 1a of the piston main body 1 to which laser light is emitted is plastically deformed by the shock wave and is slightly recessed, whereby minute concavities and convexities are formed on the surface 2a of the modified layer 2, as shown in FIG. 4. At this time, a large change or a small change in the surface roughness of the surface 2a of the modified layer 2 formed with the minute concavities and convexities may occur relative to the surface roughness of the cutting surface before the laser peening treatment. In other words, when the surface roughness of the cutting surface is sufficiently small, the surface roughness of the surface 2a of the modified layer 2 formed with the minute concavities and convexities is likely to be larger than the surface roughness of the cutting surface. When the surface roughness of the cutting surface is large, on the other hand, the surface roughness of the surface 2a of the modified layer 2 formed with the minute concavities and convexities is likely to be smaller than the surface roughness of the cutting surface. In other words, the aforementioned terms "the surface roughness of the cutting surface is changed" include both a large change and a small change in the surface roughness of the cutting surface.

According to the aforementioned embodiment, the following effects can be obtained.

According to this embodiment, as hereinabove described, the modified layer 2 having the surface 2a made of aluminum oxide by plasma oxidation, to which compressive residual stress is applied, is formed on the surface 1a (the outer surface 10a and the inner surface 10b of the top portion 10, the outer surface 11a and the inner surface 11b of the skirt portion 11) of the strength reinforced portion of the piston main body 1. Thus, the surface 2a of the modified layer 2 is made of aluminum oxide having high hardness by plasma oxidation, and hence the hardness of the surface 2a of the modified layer 2 can be improved. Furthermore, stress required to generate plastic deformation can be increased due to the modified layer 2 to which compressive residual stress is applied, and hence the mechanical strength of the piston 100 can be sufficiently improved not only at normal temperature but also in the high-temperature environment of at least about 250° C. Thus, even when the thickness of the piston 100 is further reduced, the fatigue strength in the high-temperature environment required by the piston 100 can be sufficiently ensured. The thickness and weight of the piston 100 can be further reduced, and hence the weights of other members (a con rod, a flywheel, etc.) of the engine adjusted according to the weight of the piston 100 can also be reduced. Consequently, the weight of the entire engine can be reduced, and hence the fuel efficiency of the engine can be improved.

According to this embodiment, the hardness of the modified layer 2 is made larger than the hardness of the Al-12Si—Cu—Ni alloy (the base material 3 of the piston main body 1) on which no laser peening treatment is performed when the piston 100 is arranged not only at normal temperature but also in the high-temperature environment of at least about 250° C. Thus, not only the hardness of the aluminum oxide film 2b in the vicinity of the surface 2a of the modified layer 2, made of aluminum oxide by plasma oxidation but also the hardness of the modified layer 2 (internal layer 2c) other than the surface 2a can be made larger than the hardness of the base material 3, and hence the hardness of the modified layer 2 can be further improved. Consequently, the fatigue strength in the high-temperature environment required by the piston 100 can be easily improved even when the thickness of the piston 100 is further reduced.

According to this embodiment, the surface 1a (the casting surface and the cutting surface) of the strength reinforced portion of the piston main body 1 made of cast metal is instantaneously taken to an extremely high temperature of at least about 5000° C. by the plasma, whereby the casting surface and the cutting surface are melted once and are resolidified such that the surface 2a of the modified layer 2 is formed. Thus, the casting surface and the cutting surface are melted and resolidified, whereby the minute defects such as the cold shuts, the blowholes, or the like formed in the casting surface can be removed, and the surface roughness of the cutting surface is changed such that the minute concavities and convexities can be formed. Thus, the fatigue strength of the modified layer 2 in the high-temperature environment can be further improved.

According to this embodiment, the modified layer 2 is formed by the laser peening treatment, whereby the modified layer 2 having the surface 2a (aluminum oxide film 2b) made of aluminum oxide by plasma oxidation, to which compressive residual stress is applied can be easily formed on the surface 1a of the strength reinforced portion of the piston main body 1. Furthermore, the laser peening treatment is used to emit the laser light while controlling emission conditions such as an emission position, and hence the modified layer 2 can be more evenly formed on the surface 1a of the strength reinforced portion of the piston main body 1, as compared with shot peening treatment in which powders are randomly injected onto a surface.

According to this embodiment, the modified layer 2 having the aluminum oxide film 2b is formed on the inner surface 10b of the top portion 10 of the piston main body 1, whereby the hardness of the inner surface 10b of the top portion 10 of the piston main body 1 to which a large load is applied can be sufficiently improved, and hence the mechanical strength of the piston 100 can be sufficiently improved. Thus, the fatigue strength in the high-temperature environment required by the piston 100 can be ensured while the thickness (weight) of the top portion 10 of the piston main body 1 is reduced.

According to this embodiment, the modified layer 2 is modified to have the hardness larger than the hardness of the base material 3 of the piston main body 1 by the strain age hardening caused by the fine precipitates induced by the peening treatment and the work-hardening caused by the increase in dislocation density. According to this structure, stress required to generate plastic deformation can be increased due to the modified layer 2 having the improved hardness, and hence the mechanical strength of the piston 100 in the high-temperature environment can be sufficiently improved. Thus, the fatigue strength in the high-temperature environment can be sufficiently ensured even when the thickness of the piston 100 used in the high-temperature environment is further reduced. Furthermore, the piston 100 can be reduced in thickness and weight, and hence the weight of a mechanical product (engine) using the piston 100 can be reduced.

A method for manufacturing (a method for treating the surface of) the piston 100 according to this embodiment is now described with reference to FIGS. 1 to 6.

First, the melted Al-12Si—Cu—Ni alloy (aluminum alloy) is poured into the casting mold, whereby the piston main body 1 (see FIGS. 1 to 3) is cast and is extracted from the casting mold. At this time, the cold shuts, the blowholes, or the like having the minute defects are formed in the surface 1a of the piston main body 1 including the casting surface. Then, the prescribed portion such as the central portion of the top portion 10 of the piston main body 1 is cut. Thus, the cutting surface is formed in the prescribed portion of the piston main body 1. Then, the laser peening treatment is performed on the surface 1a (the outer surface 10a and the inner surface 10b of the top portion 10, the outer surface 11a and the inner surface 11b of the skirt portion 11) including the casting surface or the cutting surface of the strength reinforced portion of the piston main body 1.

Figure 6:
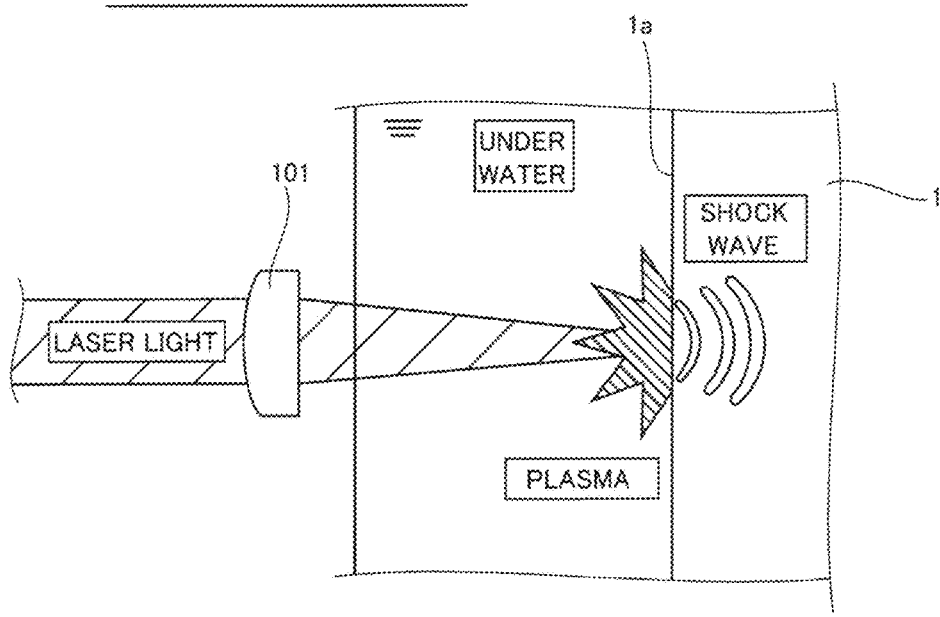
FIG. 6 A schematic view for illustrating a method for manufacturing the piston according to the embodiment of the present invention.

Specifically, the piston main body 1 is first arranged under water, as shown in FIG. 6. Then, a Q-switch YAG pulse laser generator (SAGA manufactured by Thales Laser) is used to emit laser light having a wavelength of about 530 nm to the strength reinforced portion (the top portion 10, the skirt portion 11) of the piston main body 1. As laser light emission conditions, the pulse width of the laser light is set to an ultrashort pulse width of about 8 nanoseconds, and the power density (the output of the laser light emitted per square centimeter) of the laser light is set to high peak output density of at least about 2.5 $GW/cm^2$ and not more than about 10 $GW/cm^2$. Furthermore, a lens 101 is adjusted such that the spot diameter (the diameter of a region to which the laser light is emitted) of the laser light is at least about 400 μm and not more than about 800 μm.

Thus, on the surface 1a of the piston main body 1 under water, to which the laser light is emitted, the Al-12Si—Cu—Ni alloy (the base material 3 of the piston main body 1) is evaporated and ionized such that the plasma is generated. This plasma causes the surface 1a of the piston main body 1 under water, to which the laser light is emitted, to reach an extremely high temperature of at least about 5000° C. However, this temperature rise is localized and instantaneous, and the heat is rapidly released peripherally. Thus, the surface 1a of the piston main body 1 is cooled, and hence the temperature rise is limited to the surface 1a of the piston main body 1 to which the laser light is emitted.

Furthermore, the generated plasma causes the volume on the surface 1a of the piston main body 1 to which the laser light is emitted to rapidly expand. At this time, water located on the surface 1a of the piston main body 1 cannot be immediately moved, and hence diffusion of the shock wave by the generated plasma from the strength reinforced portion of the piston main body 1 is suppressed. Thus, the pressure of the plasma reaches several tens of thousands of atmospheres, and the shock wave is concentrated and transmitted from the surface 1a of the piston main body 1 to a deep region inside the piston main body 1. Consequently, the shock wave causes the plastic deformation, compressive residual stress is applied to the surface 1a of the piston main body 1 to which the laser light is emitted, and a number of dislocations are formed such that the dislocation density becomes larger than the dislocation density of the base material 3. In addition, minute concave portions are formed on the surface 1a of the piston main body 1. Thus, the modified layer 2 shown in FIG. 4 is easily formed on the surface 1a (2a) of the piston main body 1 to which the laser light is emitted. The modified layer 2 is formed with the thickness (depth) t1 of at least about 500 μm.

As shown in FIG. 5, the aluminum oxide film 2b is formed on the surface 2a of the modified layer 2 by plasma oxidation in which cationized Al is coupled with oxygen when the plasma is generated on the surface 1a of the piston main body 1. The plasma causes the surface 1a (the casting surface and the cutting surface) of the strength reinforced portion of the piston main body 1 to instantaneously reach an extremely high temperature of at least about 5000° C., whereby the casting surface and the cutting surface are melted once and are cooled rapidly to be resolidified. Thus, the minute defects existing in the cold shuts, the blowholes, or the like of the casting surface are repaired, and the surface 2a of the modified layer 2 in which the surface roughness of the cutting surface is changed is formed.

Then, the laser light is emitted to the entire surface 1a (the outer surface 10a and the inner surface 10b of the top portion 10, the outer surface 11a and the inner surface 11b of the skirt portion 11) of the strength reinforced portion of the piston main body 1. As laser light emission conditions, the laser light is emitted such that there are a plurality of (three or seven, for example) coverages (scanning operation is performed a plurality of times). Thus, the minute concavities and convexities are formed on the surface 2a of the modified layer 2. Consequently, the surface treatment on the surface 1a of the strength reinforced portion of the piston main body 1 is terminated, and the piston 100 shown in FIGS. 1 to 3 before strain age hardening is manufactured.

The piston main body 1 (piston 100) is arranged for the prescribed time in the high-temperature environment (the environment where the piston main body 1 is actually used) of about 250° C. not more than the recrystallization end temperature (about 400° C.), whereby the strain age hardening causes the plurality of fine precipitates containing the intermetallic compound and/or the intermediate phase each made of Al and Cu and the intermetallic compound and/or the intermediate phase each made of Al and Ni to congregate in the dislocations in the modified layer 2. Thus, the modified layer 2 (the aluminum oxide film 2b and the internal layer 2c) are formed with hardness larger than the hardness of the base material 3 of the piston main body 1 by the strain age hardening caused by the fine precipitates. This high-temperature environment may be a high-temperature environment provided before the piston 100 is mounted on the internal combustion (engine) or a high-temperature environment occurring when a user uses the vehicle including the internal combustion mounted with the piston 100.

In the manufacturing method according to the aforementioned embodiment, the following effects can be obtained.

In the manufacturing method according to the aforementioned embodiment, as hereinabove described, the laser light is emitted to the surface 1a of the strength reinforced portion of the piston main body 1 such that there are the plurality of coverages (scanning operation is performed a plurality of times), and hence the minute concavities and convexities can be reliably formed on the surface 2a of the modified layer 2.

Examples

Confirmatory experiments (examples) conducted in order to confirm the aforementioned effects of the embodiment are now described with reference to FIGS. 7 to 11. A rotary bending test, a tensile test, residual stress measurement, and hardness distribution measurement conducted as the confirmatory experiments are hereinafter described.

(Rotary Bending Test, Tensile Test)

The rotary bending test is now described. In this rotary bending test, a test specimen made of an Al-12Si—Cu—Ni alloy (aluminum alloy) was prepared. This test specimen was shaped and dimensioned so as to comply with the Japanese Industrial Standards (JIS Z 2274) related to a rotary bending test. A surface treatment similar to the surface treatment on the surface 1a of the strength reinforced portion of the piston main body 1 according to the aforementioned embodiment was performed on the prepared test specimen. Specifically, laser light having a wavelength of about 530 nm was emitted to a strength reinforced portion (a top portion 10, a skirt portion 11) of a piston main body 1. As laser light emission conditions, the pulse width of the laser light was set to an ultrashort pulse width of about 8 nanoseconds, and the power density of the laser light was set to high peak output density of about 10 GW/cm². The spot diameter of the laser light was set to about 400 µm. In addition, the laser light was emitted such that there were seven coverages. This laser peening treatment (LP treatment) was performed on a substantially entire surface of the test specimen, whereby the test specimen according to Example 1 corresponding to the aforementioned embodiment was prepared.

In Comparative Example 1 for Example 1, a test specimen on which the common shot peening treatment (SP treatment) not the laser peening treatment was performed was prepared, unlike the test specimen according to Example 1. Specifically, metal particles were applied at a prescribed pressure to a surface of an Al-12Si—Cu—Ni alloy such that compressive stress was applied to the surface of the Al-12Si—Cu—Ni alloy, whereby the test specimen according to Comparative Example 1 for Example 1 was prepared. As Comparative Example 2 for Example 1, an untreated test specimen on which neither the laser peening treatment nor the shot peening treatment was performed was directly used, unlike the test specimens according to Example 1 and Comparative Example 1.

The test specimens according to Example 1 and Comparative Examples 1 and 2 were thermally treated for 100 hours under a temperature condition of 250° C. so that the same were arranged for a prescribed time in a high-temperature environment. Then, as the rotary bending test, a rotary bending force was continuously repeatedly applied to each of the test specimens according to Example 1 and Comparative Examples 1 and 2 so as to obtain cycle numbers taken for breakage of the test specimens according to Example 1 and Comparative Examples 1 and 2 as fatigue strength (fatigue strength in the high-temperature environment). The fatigue strength tends to increase in direct proportion to tensile strength while the hardness tends to increase in direct proportion to tensile strength, and hence the fatigue strength tends to increase when the hardness is large.

Figure 7:
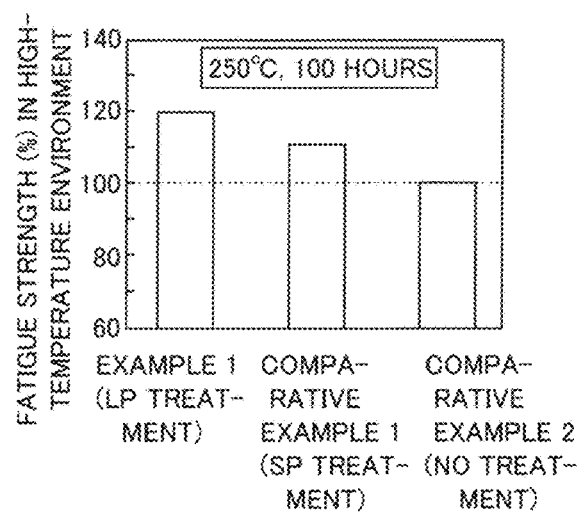
FIG. 7 A diagram showing results of a rotary bending test (fatigue strength) conducted in order to confirm the effect of the present invention.

A percentage of the cycle number of each of Example 1 and Comparative Example 1 based on the cycle number of Comparative Example 2 serving as a reference (100%) is shown in FIG. 7. According to results of the rotary bending test shown in FIG. 7, the cycle number of the test specimen according to Example 1 was increased to 120% relative to the cycle number of the untreated test specimen (the test specimen according to Comparative Example 2). In other words, the fatigue strength of the test specimen according to Example 1 was significantly improved as compared with the fatigue strength of the untreated test specimen in the high-temperature environment. On the other hand, the cycle number of the test specimen according to Comparative Example 1 was increased to 111% relative to the fatigue strength of the untreated test specimen. Consequently, it has been proved that the fatigue strength in the high-temperature environment, which is the environment where the piston 100 is actually used, can be significantly improved by the laser peening treatment as compared with by the shot peeing treatment.

The tensile test is now described. In this tensile test, the same test specimens as the test specimen according to the aforementioned Example 1 on which the laser peening treatment was performed and the untreated test specimen according to the aforementioned Comparative Example 2 on which no peening treatment was performed were used. The test specimens were thermally treated for 100 hours under a temperature condition of 250° C. so that the same were arranged for a prescribed time in a high-temperature environment. Then, the test specimens according to Example 1 and Comparative Example 2 were pulled from both ends by a tensile tester. Then, stress when plastic strain is 0.2% (0.2% proof stress (0.2% proof stress in the high-temperature environment)) and maximum applicable stress (tensile strength (tensile strength in the high-temperature environment)) were measured.

Figure 8:
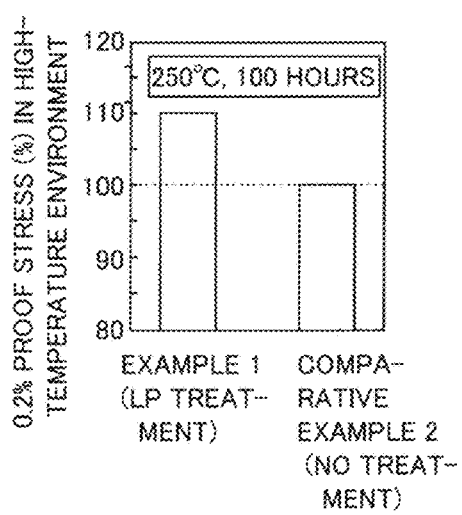
FIG. 8 A diagram showing results of 0.2% proof stress in a tensile test conducted in order to confirm the effect of the present invention.
Figure 9:
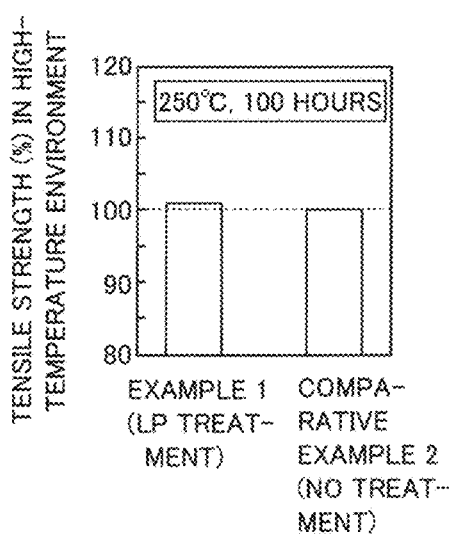
FIG. 9 A diagram showing results of the tensile strength in the tensile test conducted in order to confirm the effect of the present invention.

The 0.2% stress and the tensile strength of Example 1 based on the 0.2% stress and the tensile strength of Comparative Example 2 serving as a reference (100%) are shown in FIGS. 8 and 9. According to results of the 0.2% stress in the high-temperature environment shown in FIG. 8, the 0.2% stress of the test specimen according to Example 1 in the high-temperature environment was increased to 110% relative to the 0.2% stress of the untreated test specimen (the test specimen according to Comparative Example 2) in the high-temperature environment. According to results of the tensile strength in the high-temperature environment shown in FIG. 9, the tensile strength of the test specimen according to Example 1 in the high-temperature environment was increased to 101% relative to the tensile strength of the untreated test specimen in the high-temperature environment. Consequently, it has been proved that the 0.2% stress and the tensile strength in the high-temperature environment, which is the environment where the piston 100 is actually used, can be improved by the laser peening treatment as compared with without performing the treatment.

It has been proved from these results that the mechanical strength can be improved by forming the modified layer by the laser peening treatment, as compared with the case where the modified layer is formed by the shot peening treatment (Comparative Example 1) and the case where no modified layer is formed (Comparative Example 2). This is conceivably because the hardness of the modified layer is improved due to the aluminum oxide film made of aluminum oxide having high hardness and the compressive residual stress. Consequently, the mechanical strength of the piston can be sufficiently improved by the laser peening treatment even in the high-temperature environment of at least 250° C., and hence it has been confirmable that the fatigue strength in the high-temperature environment required by the piston can be sufficiently ensured even when the thickness of the piston is further reduced.

(Residual Stress Measurement)

The residual stress measurement is now described. In this residual stress measurement, piston main bodies made of an Al-12Si—Cu—Ni alloy (aluminum alloy) were prepared. Then, the laser peening treatment (LP treatment) was performed on surfaces 1a (the outer surfaces 10a and the inner surfaces 10b of top portions 10, the outer surfaces 11a and the inner surfaces 11b of skirt portions 11) of strength reinforced portions of four piston main bodies 1 under emission conditions similar to the aforementioned Example 1. In this manner, four pistons formed with modified layers by the laser peening treatment were prepared as Example 2.

On the other hand, as Comparative Example 3 for Example 2, two pistons formed with modified layers by the common shot peening treatment (SP treatment) were prepared, similarly to the aforementioned Comparative Example 1.

One piston according to Example 2 (Example 2-1) and one piston according to Comparative Example 3 (Comparative Example 3-1) were not thermally treated. Furthermore, one piston according to Example 2 (Example 2-2) and one piston according to Comparative Example 3 (Comparative-Example 3-2) were thermally treated for 100 hours under a temperature condition of 250° C. In addition, one piston according to Example 2 (Example 2-3) was thermally treated for 100 hours under a temperature condition of 300° C., and one piston according to Example 2 (Example 2-4) were thermally treated for 100 hours under a temperature condition of 400° C. In other words, the pistons according to Example 2-2 to Example 2-4 and Comparative Example 3-2 were arranged for a prescribed time (100 hours) in a high-temperature environment.

Then, the strength reinforced portions formed with the modified layers of the four pistons according to Example 2 and the two pistons according to Comparative Example 3 were measured by an X-ray diffraction measurement device, whereby residual stress (MPa) at depth positions (μm) from the surfaces of the piston main bodies was obtained.

Figure 10:
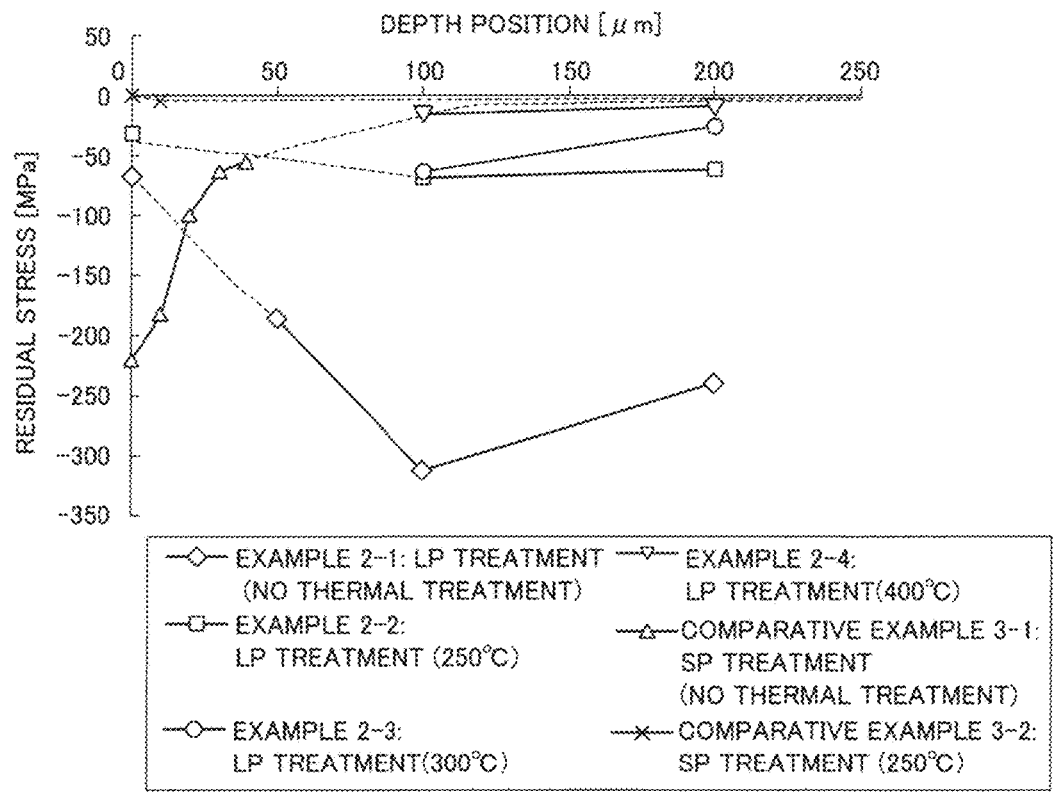
FIG. 10 A diagram showing results of residual stress measurement conducted in order to confirm the effect of the present invention.

The residual stress of Example 2 and Comparative Example 3 is shown in FIG. 10. FIG. 10 shows that compressive stress remains when the residual stress is negative and tensile stress remains when the residual stress is positive. According to results of the residual stress measurement shown in FIG. 10, in Example 2-1 in which the laser peening treatment was performed but no thermal treatment was performed, the residual stress at a depth position of 100 μm was −312 MPa, and the residual stress even at a depth position of 200 μm was −242 MPa. In Comparative Example 3-1 in which the shot peening treatment was performed but no thermal treatment was performed, on the other hand, a certain amount of compressive residual stress was measured from the surface to a depth position of 50 μm, but no compressive residual stress was measured at a depth position of at least 100 μm. This is conceivably because in the shot peening treatment, pressure applied to the surface of the piston main body was so weak that an internal portion of the piston main body could not be sufficiently modified. Thus, it has been proved that compressive residual stress can be applied to not only the outermost surface but also the internal portion of the piston main body at the depth position of at least 100 μm by the laser peening treatment.

In Comparative Example 3-2, in which the shot peening treatment was performed, of Example 2-2 to Example 2-4 and Comparative Example 3-2 in which thermal treatment was performed, the residual stress was about 0 MPa. This is conceivably because the compressive residual stress was substantially released by the thermal treatment. In Example 2-2 to Example 2-4 in which the laser peening treatment was performed, on the other hand, the compressive residual stress partially remained even after the thermal treatment was performed. Thus, it has been proved that the compressive residual stress partially remains due to the laser peening treatment even if the thermal treatment is performed (even if the piston is arranged in the high-temperature environment), and a reduction in the hardness can be suppressed to some extent. In Example 2-2 in which the thermal treatment was performed at 250° C., a larger amount of compressive residual stress remained as compared with those in Example 2-3 and Example 2-4 in which the terminal treatment was performed at 300° C. and 400° C., respectively. Thus, it has been proved that the residual stress is more easily released as the terminal treatment is performed at a higher temperature. This is conceivably because the thermal motion of a metal atom in the modified layer is increased as the temperature is increased, and recrystallization is more frequently performed, so that the compressive residual stress is easily released peripherally.

(Hardness Measurement)

The hardness measurement is now described. In this hardness measurement, the piston according to Example 2-1 of the aforementioned residual stress measurement, in which the laser peening treatment (LP treatment) but no thermal treatment was performed on the surface 1a of the strength reinforced portion, was used. A portion of the piston according to Example 2-1 in which no thermal treatment was performed, formed with the modified layer by the laser peening treatment and a portion of the piston according to Example 2-1 formed with no modified layer (a portion on which no laser peening treatment is performed) were cut in a thickness (depth) direction and were polished, whereby cut pieces 1 and 2 were prepared. In addition, the piston according to Example 2-2 of the aforementioned residual stress measurement, in which on the surface 1a of the strength reinforced portion, the laser peening treatment (LP treatment) was performed, and thereafter the thermal treatment was performed at 250° C., was used. A portion of the piston according to Example 2-2 in which the thermal treatment was performed, formed with the modified layer by the laser peening treatment and a portion of the piston according to Example 2-2 formed with no modified layer were cut in the thickness (depth) direction and were polished, whereby cut pieces 3 and 4 were prepared.

Then, an indenter for measuring microhardness was pressed against a plurality of depth positions of each of the cut pieces 1 and 3 at a load of 20 gf, and the Vickers hardness was obtained on the basis of the surface area of each dent formed by the pressing of the indenter. In each of the cut pieces 2 and 4, the hardness is conceivably constant regardless of a depth position, and hence the Vickers hardness was obtained at only one position.

Figure 11:
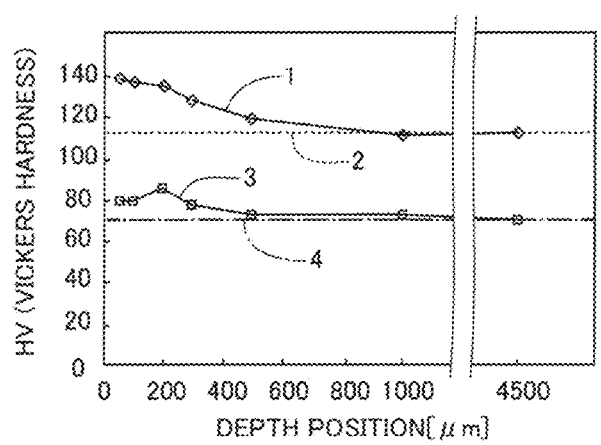
FIG. 11 A diagram showing results of hardness measurement conducted in order to confirm the effect of the present invention.
Figure 11:
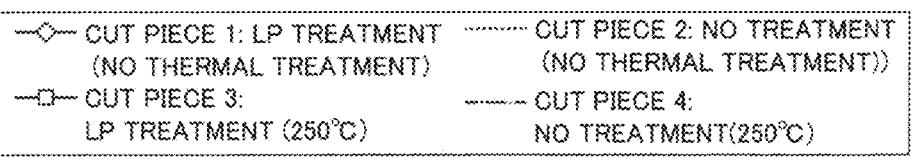

According to results of the Vickers hardness shown in FIG. 11, the Vickers hardness of the cut piece 1 on which the laser peening treatment was performed was larger than the Vickers hardness of the cut piece 2 on which no laser peening treatment was performed in a range from the surface to a depth position of at least 500 μm when the cut pieces 1 and 2 on which no thermal treatment was performed were compared with each other. Thus, it has been proved that in the range from the surface to the depth position of at least 500 μm, the modified layer is formed by the laser peening treatment so that the Vickers hardness can be improved. When the cut pieces 3 and 4 on which the thermal treatment was performed were compared with each other, the Vickers hardness of the cut piece 3 on which the laser peening treatment was performed was larger than the Vickers hardness of the cut piece 4 on which no laser peening treatment was performed. Thus, it has been proved that the modified layer formed by the laser peening treatment remains in the range from the surface to the depth position of at least 500 μm so that the Vickers hardness can be improved.

When the cut pieces 1 and 3 on which the laser peening treatment was performed were compared with each other, the Vickers hardness of the cut piece 3 on which the thermal treatment was performed was smaller than the Vickers hardness of the cut piece 1 on which no thermal treatment was performed. When the cut pieces 2 and 4 on which no laser peening treatment was performed were compared with each other, the Vickers hardness of the cut piece 4 on which the thermal treatment was performed was smaller than the Vickers hardness of the cut piece 2 on which no thermal treatment was performed. This is conceivably because the compressive residual stress was partially released due to recrystallization resulting from the thermal treatment.

At a depth position deeper than a depth position of 1000 μm from the surface, on the other hand, the Vickers hardness of the cut piece 1 on which no thermal treatment was performed and the Vickers hardness of the cut piece 2 on which no thermal treatment was performed were substantially equal to each other, and the Vickers hardness of the cut piece 3 on which the thermal treatment was performed and the Vickers hardness of the cut piece 4 on which the thermal treatment was performed were substantially equal to each other. Thus, the modified layer is conceivably hardly formed at the depth position deeper than the depth position of 1000 μm from the surface.

The embodiment and Examples disclosed this time must be considered as illustrative in all points and not restrictive. The range of the present invention is shown not by the above description of the embodiment and Examples but by the scope of claims for patent, and all modifications within the meaning and range equivalent to the scope of claims for patent are further included.

For example, while the example of applying the present invention to the piston 100 used in the internal combustion (engine) of the vehicle has been shown in the aforementioned embodiment, the present invention is not restricted to this. The present invention may alternatively be applied to a piston used in an internal combustion of a vessel, an aircraft, or the like, for example.

While the example of forming the modified layer 2 on the outer surface 10a and the inner surface 10b of the top portion 10 of the piston main body 1 and the outer surface 11a and the inner surface 11b of the skirt portion 11 serving as the surface of the strength reinforced portion by the laser peening treatment has been shown in the aforementioned embodiment, the present invention is not restricted to this. According to the present invention, the laser peening treatment may not be performed on all the outer surface 10a and the inner surface 10b of the top portion 10 of the piston main body 1 and the outer surface 11a and the inner surface 11b of the skirt portion 11, but the modified layer 2 may alternatively be formed on only any one of the surfaces by the laser peening treatment. In this case, the laser peening treatment is preferably performed on at least the upper regions (the regions shown by the one-dot chain lines in FIGS. 1 to 3) of the inner surface 10b of the top portion 10 and the inner surface 11b of the skirt portion 11 to which particularly large stress (load) is applied. Furthermore, the laser peening treatment may alternatively be performed on the entire surface of the piston main body 1. In addition, the laser peening treatment may alternatively be performed on a surface of a prescribed portion to be reinforced other than the outer surface 10a and the inner surface 10b of the top portion 10 of the piston main body 1 and the outer surface 11a and the inner surface 11b of the skirt portion 11 serving as the aforementioned surface of the strength reinforced portion. While the example of performing the laser peening treatment on both the casting surface and the cutting surface has been shown, the present invention is not restricted to this, but the laser peening treatment may alternatively be performed on either the casting surface or the cutting surface.

While the example of emitting the laser light to the strength reinforced portion of the piston main body 1 in a state where the piston main body 1 is arranged under water when the laser peening treatment is performed has been shown in the aforementioned embodiment, the present invention is not restricted to this. According to the present invention, it is only required to form a liquid film on the surface of the strength reinforced portion of the piston main body when the laser peening treatment is performed. The laser peening treatment may alternatively be performed in a state where the piston main body is arranged under oil not water, for example, or the laser peening treatment may alternatively be performed while liquid (water or oil) is continuously poured onto the surface of the strength reinforced portion of the piston main body.

While the example of making the piston main body 1 of the Al-12Si—Cu—Ni alloy (aluminum alloy) has been shown in the aforementioned embodiment, the present invention is not restricted to this. According to the present invention, an aluminum alloy such as an Al—Cu—Ni—Mg alloy other than the Al-12Si—Cu—Ni alloy may alternatively be used as the aluminum alloy, for example. Alternatively, the piston main body may be made of A1000 series pure aluminum.

In the aforementioned embodiment, the pulse width of the laser light is set to the ultrashort pulse width of about 8 nanoseconds, and the power density of the laser light is set to the high peak output density of at least about 2.5 GW/cm$^2$ and not more than about 10 GW/cm$^2$, as the emission conditions of the laser peening treatment. While the example in which the spot diameter of the laser light is set to at least about 400 μm and not more than about 800 μm and there are the plurality of coverages has been shown in the aforementioned embodiment, the present invention is not restricted to this. According to the present invention, the laser light emission conditions of the laser peening treatment may alternatively be changed so far as the modified layer having the surface made of aluminum oxide by plasma oxidation, to which compressive residual stress is applied, can be formed. For example, the pulse width of the laser light may be a pulse width of other than about 8 nanoseconds so far as the same is an ultrashort pulse width of not more than about 100 nanoseconds.

While the case where the piston main body 1 (piston 100) on which the laser peening treatment is performed is arranged for at least 50 hours in the high-temperature environment of about 250° C. not more than the recrystallization end temperature (about 400° C.), which is an environment where the piston 100 is used and is heated has been shown in the aforementioned embodiment, according to the present invention, the piston may alternatively be arranged in a high-temperature environment of other than about 250° C. (about 300° C., for example) and be heated so far as the temperature is not more than the recrystallization end temperature (about 400° C.). Also in this case, the hardness of the modified layer is improved by inhibition of the movement of the dislocations in the modified layer by the fine precipitates congregating in the dislocations, and hence stress required to generate plastic deformation is conceivably increased, similarly to the case where the piston is arranged in the high-temperature environment of about 250° C.

DESCRIPTION OF REFERENCE NUMERALS

1: piston main body
1a: surface of strength reinforced portion
2: modified layer
10: top portion (strength reinforced portion)

10a: outer surface (of top portion) (surface (of strength reinforced portion))
10b: inner surface (of top portion) (surface (of strength reinforced portion))
11: skirt portion (strength reinforced portion)
11a: outer surface (of skirt portion) (surface (of strength reinforced portion))
11b: inner surface (of skirt portion) (surface (of strength reinforced portion))
100: piston

The invention claimed is:

1. A method for manufacturing a piston, comprising:
preparing a piston main body made of aluminum or an aluminum alloy, used in an internal combustion;
generating plasma by emission of laser light of ultrashort pulse high peak output density, having a pulse width of not more than 100 nanoseconds, to a surface of a strength reinforced portion of the piston main body under a prescribed emission condition and performing laser peening treatment on the strength reinforced portion of the piston main body with pressure of the plasma that is generated to form a surface made of aluminum oxide by plasma oxidation, to which compressive residual stress is applied;
causing, on the surface of the strength reinforced portion of the piston main body, work-hardening caused by an increase in dislocation density;
causing, on the surface of the strength reinforced portion of the piston main body, strain age hardening caused by congregation of a fine precipitate containing a constituent element of the piston man body in a dislocation by performing thermal treatment after the laser peening treatment has been performed; and
forming a modified layer on the surface of the strength reinforced portion of the piston main body by the strain age hardening and the work-hardening.

2. The method for manufacturing a piston according to claim 1,
wherein forming the modified layer includes forming the modified layer having the surface made of the aluminum oxide by the plasma oxidation, to which the compressive residual stress is applied, on the surface of the strength reinforced portion of the piston main body by performing the laser peening treatment on the strength reinforced portion of the piston main body in a state where a liquid film is arranged on the surface of the strength reinforced portion of the piston main body.

3. The method for manufacturing a piston according to claim 1, wherein the modified layer has hardness larger than hardness of a base material of the piston main body.

4. The method for manufacturing a piston according to claim 1, wherein
the piston main body is made of cast metal of the aluminum or the aluminum alloy, and
forming the modified layer includes melting and resolidifying a casting surface of the strength reinforced portion of the piston main body made of the cast metal and forming the modified layer having the surface made of the aluminum oxide by the plasma oxidation, to which the compressive residual stress is applied, by performing the laser peening treatment on the strength reinforced portion of the piston main body.

5. The method for manufacturing a piston according to claim 1, wherein forming the modified layer includes forming the modified layer on an inner surface of a top portion of the piston main body by performing the laser peening treatment on at least the inner surface of the top portion of the piston main body.

6. The method for manufacturing a piston according to claim 1, wherein
preparing the piston main body includes forming a cutting surface on the piston main body by cutting; and
forming the modified layer includes melting and resolidifying the cutting surface of the strength reinforced portion of the piston main body and forming the modified layer having the surface made of the aluminum oxide by the plasma oxidation, to which the compressive residual stress is applied, by performing the laser peening treatment on the strength reinforced portion of the piston main body.

7. The method for manufacturing a piston according to claim 1, wherein forming the modified layer includes forming the modified layer by scanning the surface of the strength reinforced portion of the piston main body a plurality of times with the laser light and performing the laser peening treatment on the strength reinforced portion of the piston main body.

* * * * *